Jan. 22, 1929.  1,699,715
H. D. REY
TRANSMISSION
Filed June 22, 1926   3 Sheets-Sheet 2
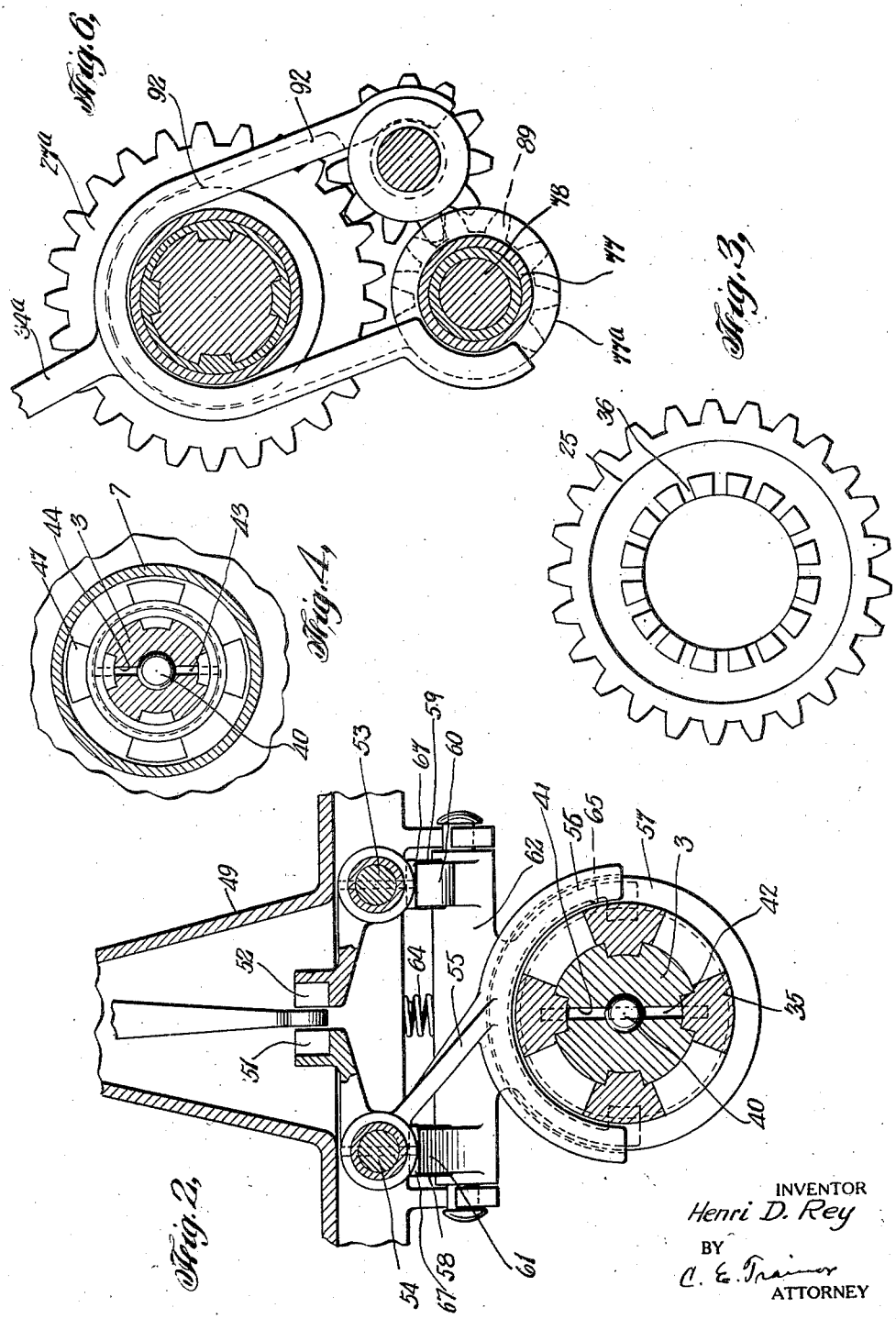
INVENTOR
Henri D. Rey
BY
C. E. Trainor
ATTORNEY

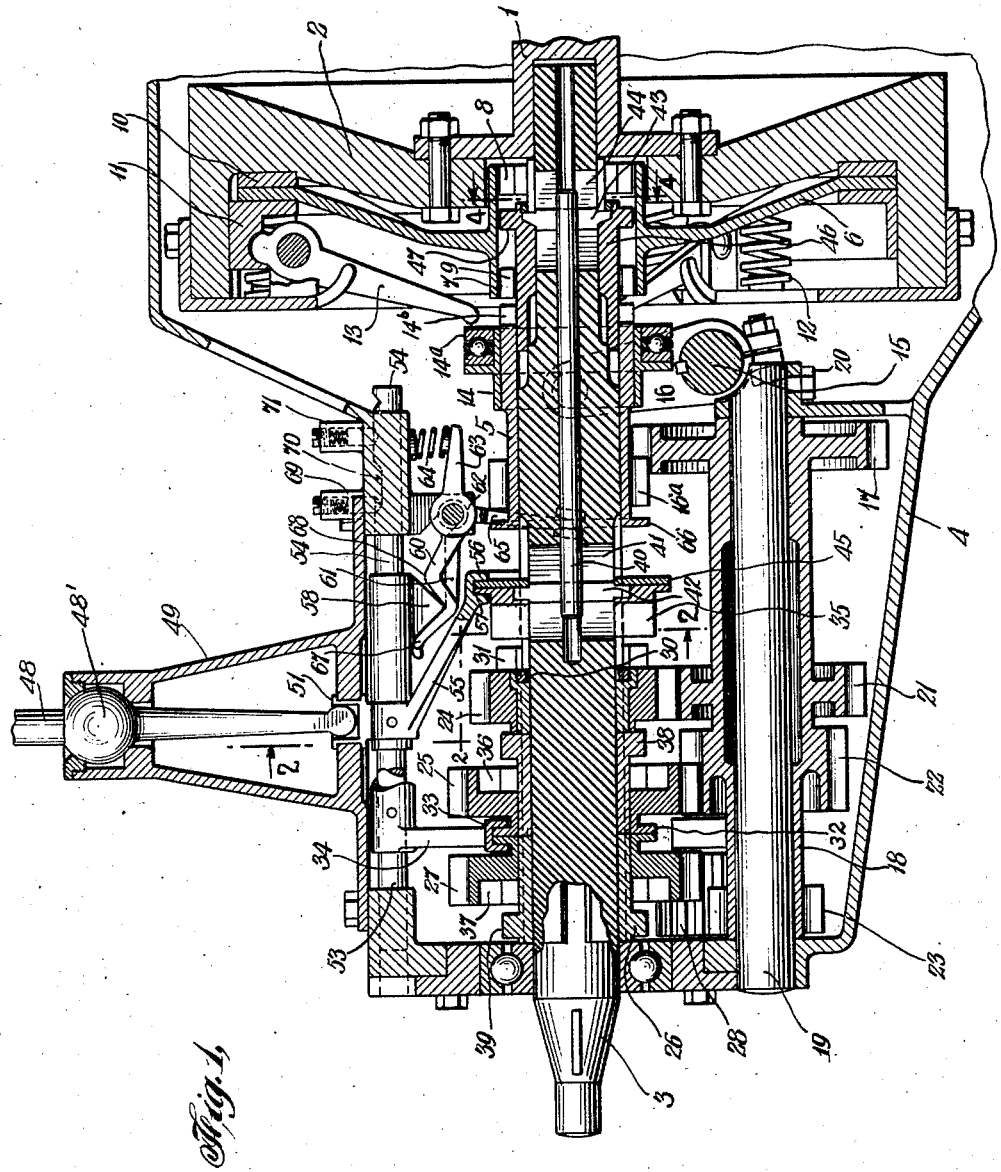

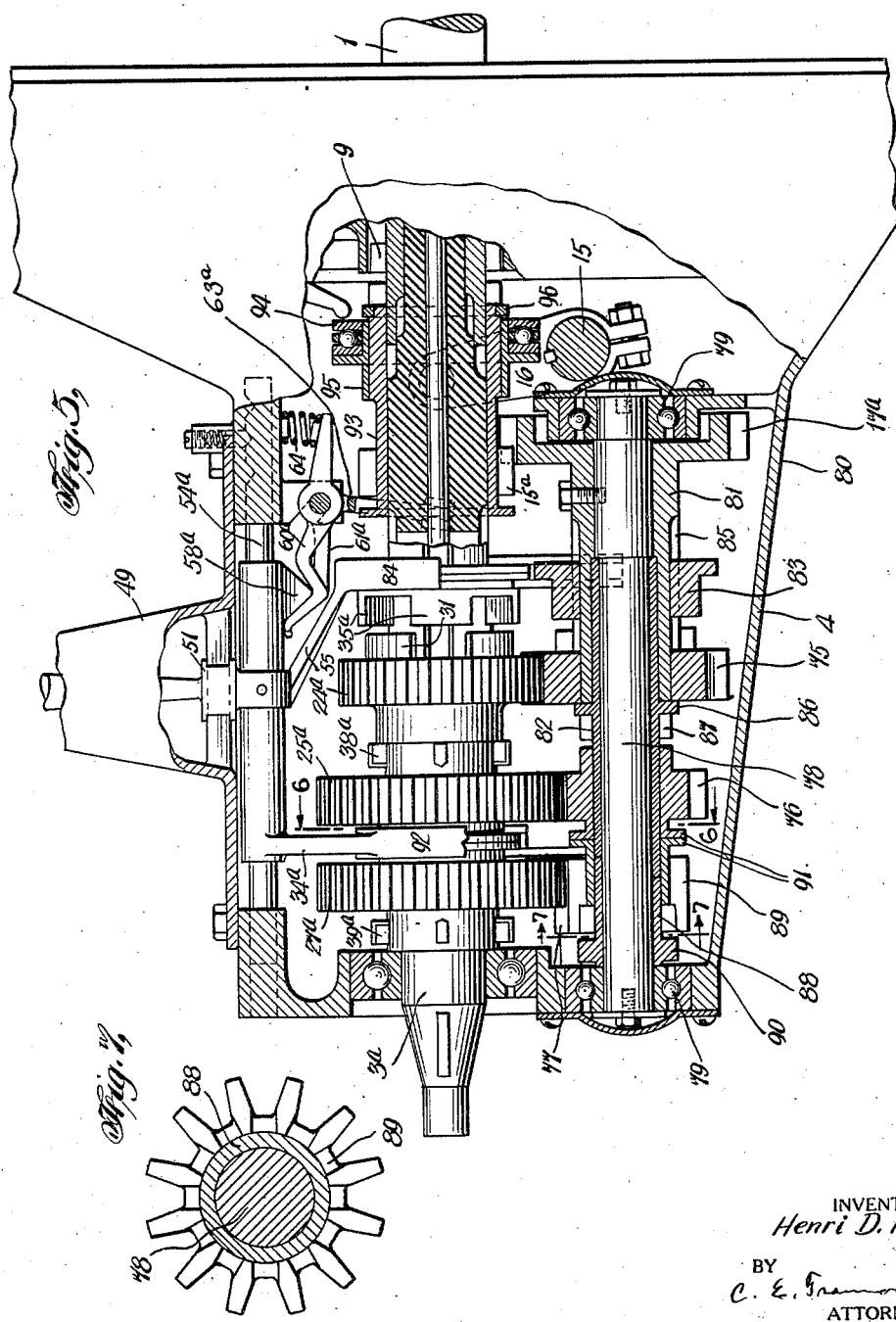

Patented Jan. 22, 1929.

1,699,715

UNITED STATES PATENT OFFICE.

HENRI DANIEL REY, OF PAPEETE, ISLAND OF TAHITI, SOCIETY ISLANDS.

TRANSMISSION.

Application filed June 22, 1926. Serial No. 117,690.

This is an invention in transmissions, and more particularly in a transmission designed to function with a minimum of noise and wear on the parts.

One of the primary objects of the invention is the provision of a transmission, wherein all of the gear trains of the variable speed device are independent one of the other, and wherein all but the selected train are immobile when idle.

With these and other objects in view the invention consists in the construction and novel combination of parts fully described hereinafter, illustrated in the accompanying drawings, and pointed out in the claims appended hereto, it being understood that various changes in the form, proportion, size and minor details of construction within the scope of the claims, may be resorted to without departing from the spirit of the invention.

In the drawings forming a part hereof:

Fig. 1 is a longitudinal section of the improved transmission.

Figs. 2 and 4 are sections on the lines 2—2, and 4—4, respectively, of Fig. 1.

Fig. 3 is a face view of one of the gears of the low speed train.

Fig. 5 is a view similar to Fig. 1, showing an alternate construction.

Figs. 6 and 7 are sections on the line 6—6, and 7—7, respectively, of Fig. 5.

In the embodiment of the invention shown in Fig. 1, the motor shaft 1 is provided with the usual flywheel 2, and the driven shaft 3 is arranged in alinement with the motor or drive shaft, all in a gear casing 4 of usual construction. The transmission shaft 5 is journaled on the forward end of the driven shaft, and is slidable longitudinally thereof. A clutch disk 6 is arranged in a cavity in the flywheel, having a hub 7, provided with internal clutch teeth 9 and 8 at each end, a series 9 at the rear end of the hub, and a series 8 at the forward end.

The peripheral edge of the disk moves between rings 10 and 11, the former on the flywheel, and the latter movable to force the disk into close engagement with the ring 10, thereby to clutch the disk to the flywheel. Springs 12 between the flywheel and the ring 11 normally urge the ring toward the disk, so that the clutch is normally operative. Levers 13 are pivoted to the flywheel, and the outer ends of the levers engage the ring 11.

The inner ends of the levers are in position for engagement by a ball supported bearing ring 14ª journaled on a hub 14, in turn journaled on the transmission shaft 5. The arrangement is such that when the hub and ring are moved forwardly the levers are operated to release the clutch disk 6.

The transmission shaft has clutch teeth 14ᵇ at its forward end, and these teeth engage the teeth of series 9 when the transmission shaft is moved forwardly, thus to connect the transmission shaft to the motor shaft. It will be evident that the forward movement of the hub and ring will release the clutch. The hub and ring are moved by the usual pedal lever not shown, connected to a shaft 15, journaled transversely of the motor shaft, and the shaft 15 has radial arms 16, rotatably connected to the hub in the usual manner.

The transmission shaft has as a part thereof a series of gear teeth 16ª always in mesh with a gear wheel 17, rigid with a sleeve 18 journaled on a counter or jack shaft 19, rigidly held in bearings in the gear case by a set screw 20. This sleeve carries gear wheels 21, 22 and 23, the gears 21 and 22 meshing with gears 24 and 25 respectively, loose on a sectional sleeve 26 keyed to the driven shaft. The sleeve is sectional as shown, a section being provided for each wheel, and for a third wheel 27, connected to the wheel 23 through the intermediary of an idler 28. Referring to Fig. 1, it will be seen that the gears 25 and 27 are slidable on the sections of the sleeve 26 or on the driven shaft, while the gear 24 is held from longitudinal movement on the shaft by a series of clutch teeth 38 on the sleeve 26, to be later described, and a ring 30 held in a groove on the driven shaft.

The gears 22 and 28 are wide, as shown, the teeth of the gears being long enough so the gears 27 and 25 in their sliding movement on the shaft are never out of mesh with the teeth of the said gears. The gear 24 has a series 31 of clutch teeth at its forward end, for a purpose to be presently described, and the gears 25 and 27 have annular ribs 32 at the abutting ends of their hubs, engaged by an arc shaped internally grooved member 33 carried by an arm 34 supported in a manner to be later described in detail.

A clutch ring 35 is slidably mounted on the driven shaft, the ring being provided at the end adjacent the gear 24 with openings to engage the teeth 31, thereby to connect the gear 24 to the driven shaft, and the driven shaft to the transmission shaft, through the gear train 24, 21, 17, 16ª. The gears 25 and 27 have recesses 36 and 37 on their remote faces which are adapted to mesh with the teeth 38 before mentioned, and 39, respectively, on one of the sections of the sleeve 26, that is on the driven shaft. The gears 25 and 27 move together so that when one is engaged the other is free, and they may be held in neutral position, as shown in Fig. 1, both free from the driven shaft.

A rod 40 is mounted to slide axially of the concentric shafts 1, 3 and 5, moving in an axial opening in the shaft 3, and the rod has cross pins 42 and 43 at its ends which move in slots 41 and 44 respectively in the shaft 3, and the first named pin 42 is securely connected at its ends to the ring 35 by means of a washer 45 held to the face of the ring in a manner to be described. The cross pin 43 is rigid with a clutch sleeve 46, slidable on the driven shaft, and provided at its forward end with teeth 47 to engage with the teeth of clutch 8, whereby to connect the driven shaft directly to the motor shaft, through the intermediary of the clutch disk 6.

The selective mechanism for selecting the various speeds includes a lever 48, supported on the gear case extension 49, with a ball and socket joint 48', and the lower end of the lever is adapted to engage one or the other of two sockets 51, 52, on reciprocatory rods 54, 53, mounted to slide in guides in the gear case parallel to the driven shaft. The rod 53 has the before mentioned radial arm 34, which carries the arc shaped grooved member 33, while the rod 54 has an arm 55 carrying a similar grooved member 56, which engages a radial flange 57 on the ring 35 and the washer 45. The grooved member holds the washer closely against the face of the ring and constrains the ring to move longitudinally of the shaft 3, when the rod 54 is moved.

Each of the rods 53, 54, carries a cam 58, one of which, that of the rod 54, is shown in Fig. 1. The other on the rod 53, which is precisely like that on the rod 54, is omitted from Fig. 1, for the sake of clearness, the lever 60 with which it cooperates in a manner to be described, being however, shown. The cam 58 of the rod 54 normally engages a lever 61, while the like cam on the rod 53 cooperates with a lever 60, both levers 60 and 61 being carried by a sleeve 62, journaled on an axis transverse to the driven shaft.

The sleeve has a third arm 63, normally pressed downward by a spring 64, arranged between the arm and the gear case, and a fourth arm 65 provided with a substantially U-shaped portion engaging a radial flange 66 on the rear end of the transmission shaft. The arrangement is such that when the levers are moved downwardly the transmission shaft is moved forwardly and into engagement with the clutch 9, to couple the shaft to the disk 6.

Each of the cam arms 60, 61, has an angular portion at its rear end, that of the arm 60 being indicated at 67, cooperating with one face of the cam 58 of the adjacent rod, and the arm 60 has an angular portion 68 intermediate its ends designed to cooperate with the opposite or forward face of the cam 58 of the rod 53. The cams and angular portions have cooperating inclined faces to swing the rear ends of the arms downward when the cams pass onto the angular portions. It will be evident from the description that whenever the rod 53 moves in either direction the transmission shaft will be moved into engagement with the clutch disk 6. This will also occur when the rod 54 is moved rearwardly, but not when it moves forwardly, since the arm 61 has no cooperating angular portion in front of the cam.

The rod 54 is held from forward movement when in neutral position by means of a spring operated catch 69 of usual construction. The catch engages a long groove 70 in the rod, so placed that the rod does not have to lift the catch when it moves rearwardly as the rod is normally held from rearward movement by the cam and angular portion 67. A similar spring catch 71 is provided for the rod 53, and the said rod has three notches for engagement by the catch to hold the rod with the transmission in slow, intermediate or reverse positions.

The operation is as follows. For the low speed, the lever 48 is engaged with the socket 52, after the pedal has moved the hub 14 to release clutch disk 6, and the rod 53 is moved forwardly, that is, toward the flywheel. The cam on rod 53 depresses arm 60, and the transmission shaft is moved forwardly into engagement with clutch teeth 9 on hub of disk 6. The same movement of rod 53 through arm 34 moves gear 25 into engagement with clutch teeth 38, connecting it with the driven shaft. Clutch disk 6 is now operated to couple disk 6 to the motor shaft, and the driven shaft is coupled to the motor shaft in the low speed through gears 16ª, 17, 22 and 25.

To obtain the reverse speed the rod 53 is moved rearwardly instead of forwardly, coupling gear 27 to the driven shaft. The rod is held in adjusted position by the engagement of the high parts of cam 58 and arm 60, the spring 64 holding the parts from movement. It will be noticed that the angular portions of lever 60 constitute a V-shaped bend and when the cam 58 is out of the V, it is on a straight part of the arm with no tendency to slip.

The intermediate speed is obtained by moving rod 54 rearwardly by engaging lever 48 with socket 51, the clutch disk 6 having first been released. It will be understood that this clutch is always released prior to the selection of a speed, that is, before the speed is connected to the driven shaft. The rearward movement of rod 54 swings arm 61 downward, coupling transmission shaft 5 to disk 6, and moves ring 35 into engagement with clutch teeth 31, that is, coupling the gear wheel 24 to the driven shaft. When now disk 6 is clutched to flywheel 2 the motor and driven shafts are connected through gears 16ª, 17, 21 and 24.

For the high speed or direct connection, the rod 54 is moved forwardly. The cam 58 moves along the straight part of arm 61 without moving the arm, and there is no movement of the transmission shaft as when the rod is moved rearwardly. The ring 35 is however moved toward clutch disk 6, and the rod 40 through its connection with ring 35 and clutch 46 moves the said clutch part into engagement with clutch teeth 8 in the hub of the disk 6. When now the disk is coupled to the motor shaft or flywheel the motor shaft drives the driven shaft directly. It will be evident from the description, that when disconnected from the motor shaft the gear trains are always idle or immobile.

In Fig. 5, a transmission is shown conforming in its main features to that just described but with an alternate arrangement of counter or jack shaft, and with some change in the method of moving the transmission shaft. The slide rods, one shown at 54ª, cams 58ª, and transmission shaft moving mechanism 60ª, 61ª, 63ª, are exactly the same as in Fig. 1. So also is the gear train arrangement 24ª, 25ª, 27ª and the clutch ring 35ª, so far as concerns the driven shaft 3ª, and the respective gears mesh with gears 75, 76 and 89, the gear 27ª through an idler 77, and the gears 75, 76 and 89 are on a counter shaft 78. This shaft is held in ball bearings 79 in the gear case 80.

The gear 17ª, corresponding to the gear 17 of Fig. 1, has a hub 81, fitting the shaft at one end and counterbored at the other to receive the end of a sleeve 82 on the counter shaft. A clutch ring 83 is keyed to the hub and slidable thereon and this ring is constrained to move with the ring 35ª by the curved internally grooved member 84, corresponding to the member 56 of Fig. 1, but of a length to engage radial flanges on both rings. Each ring has clutch teeth as shown to cooperate with similar teeth on the gears 24ª and 75, which are always in mesh and held from movement longitudinal to the shaft.

The gear 75 is held between the ends of the keyways 85 of the hub and radial projections 86, intermediate the ends of sleeve 82, and the gear 76 is mounted on the sleeve, at the opposite side of the projections from the gear 75. The hub 81 has clutch teeth 87 at the projections 86 which are designed to be engaged by similar teeth on the face of the gear 76. Another sleeve 88 is arranged on the shaft at the end of the sleeve 82, and the gear 89 is supported by the sleeve, and meshes with the idler 77. The gear 89 is slidable on the sleeve and is adapted to engage clutch teeth 90 on the sleeve, the face of the gear having cooperating teeth to mesh therewith.

The adjacent ends of the hubs of the gears 76 and 89 are radially flanged as shown at 91, as is also the end of the hub of the idler 77, Fig. 6, the latter flange being indicated at 77ª. The ends of the hubs of the gears 25ª and 27ª are flanged in the same manner as the corresponding gears in the Fig. 1 construction, and a yoke shaped member 92 is provided for simultaneously moving the five gears 25ª, 27ª, 76, 89 and 77, when selecting low speed or reverse. The arms and body of the yoke shaped member are internally grooved to receive the flanges, and the driven shaft 3ª has clutch teeth 38ª and 39ª for engagement by the gears 25ª and 27ª respectively.

The sleeves 82 and 88 have interlocking ends for constraining them to turn together, and the gear 17ª is locked to the shaft 78 and to the sleeve 82, so that all turn together. A further movement of the pedal which operates the transmission shaft and clutch disk 6, after the release of the disk will press the disk against ring 10, causing the gears of the trains to move, thus facilitating the engagement of the selected train. This is true in Fig. 1 as well as in Fig. 5.

The transmission shaft 93 bearing ring 94 and hub 95 are the same as the corresponding parts 5, 14ª, and 14 of Fig. 1, and operate in the same manner, to couple the transmission shaft to the clutch disk and to release the disk from the flywheel, but the transmission shaft has means whereby the hub may operate the same to couple it to and from the motor shaft. The said means is a ring 96 held in a groove in the shaft, and positioned to be engaged by the hub as it releases the clutch disk from the flywheel.

What is claimed as new is:

1. In a transmission, a motor shaft, a driven shaft, a clutch disk normally clutched to the motor shaft, means to release the disk, a plurality of means for connecting the driven shaft to the motor shaft at different speeds, selective mechanism for the several means and means operated by the selective mechanism to simultaneously connect the selected speed means to the driven shaft and to the disk.

2. In a transmission, a motor shaft, a driven shaft, a clutch disk normally clutched to the motor shaft, means to release the disk, a plurality of means for connecting the driven shaft to the motor shaft at different speeds including a transmission shaft, selective mechanism for the several means and means operated by the selective mechanism when selecting a speed means and connecting it to the driven shaft to couple the transmission shaft to the clutch disk.

3. In a transmission, a motor shaft and a driven shaft, a variable speed device including a plurality of means for connecting the shafts at various speeds, a clutch disk normally connected to the motor shaft, means to release the disk, selective mechanism for selecting the speed means and simultaneously connecting the selected means to the driven shaft and to the disk, and means operated by the selective mechanism after connection of the speed means to frictionally connect the disk to the motor shaft.

4. In a transmission, a motor shaft, a driven shaft, a clutch disk normally connected to the motor shaft, means to release the disk, a variable speed device including a plurality of trains of gears to connect the driven shaft to the disk at various speeds, selective mechanism to select the several speeds, and means operated by the selective mechanism to simultaneously connect the train of the selected speed to the driven shaft and to the disk.

5. In a transmission, a motor shaft, a driven shaft, a clutch disk normally connected to the motor shaft, means to release the disk, a variable speed device including a plurality of trains of gears to connect the driven shaft to the disk at various speeds, selective mechanism to select the several speeds, and means operated by the selective mechanism to simultaneously connect the train of the selected speed to the driven shaft and to the disk, the gears of each train always in mesh one with the other.

6. In a transmission, a motor shaft, a driven shaft, a clutch disk normally connected to the motor shaft, means to release the disk, a variable speed device including a plurality of trains of gears to connect the driven shaft to the disk at various speeds, a transmission shaft common to all the trains, selective mechanism to select the several trains, and to connect them to the driven shaft, and means operated by the selective mechanism when coupling a train to the driven shaft to couple the transmission shaft to the disk.

7. In a transmission, a motor shaft, a driven shaft, a clutch disk normally connected to the motor shaft, means to release the disk, a variable speed device including a plurality of trains of gears each independent of the other, and normally disconnected from the driven shaft, a transmission shaft having a driving connection with each train, selective mechanism for connecting any of the trains to the driven shaft, and means operated by the selective mechanism to connect the transmission shaft to the disk.

8. In a transmission, a motor shaft, a driven shaft, a clutch disk normally clutched to the motor shaft, means to release the disk, a plurality of means for connecting the driven shaft to the motor shaft at different speeds, means operated by the selective mechanism to simultaneously connect the selected speed means to the driven shaft and to the disk, and means to directly connect the driven shaft to the motor shaft.

9. In a transmission, a motor shaft, a driven shaft, a clutch disk normally clutched to the motor shaft, means to release the disk, a plurality of means for connecting the driven shaft to the motor shaft at different speeds including a transmission shaft, selective mechanism for the several means, means operated by the selective mechanism when selecting a speed means and connecting it to the driven shaft to couple the transmission shaft to the clutch disk, and means independent of the transmission shaft to directly connect the driven shaft and the motor shaft.

10. In a transmission, a motor shaft, a driven shaft, a clutch disk normally connected to the motor shaft, means to release the disk, a variable speed device including a plurality of trains of gears to connect the driven shaft to the disk at various speeds, selective mechanism to select the several speeds, means operated by the selective mechanism to simultaneously connect the train of the selected speed to the driven shaft and to the disk, and means independent of the trains to directly connect the driven shaft to the motor shaft.

Signed at Tahiti, Society Islands, French Establishments of Oceania, this 31st day of May, A. D. 1926.

HENRI DANIEL REY.